US008032429B2

(12) United States Patent
Shafer

(10) Patent No.: US 8,032,429 B2
(45) Date of Patent: Oct. 4, 2011

(54) METHOD AND IDENTIFICATION TAG FOR ASSET MANAGEMENT

(75) Inventor: Steven Shafer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1849 days.

(21) Appl. No.: 10/798,007

(22) Filed: Mar. 10, 2004

(65) Prior Publication Data

US 2005/0209947 A1  Sep. 22, 2005

(51) Int. Cl.
*G06Q 10/00* (2006.01)
(52) U.S. Cl. .......................................... 705/28; 340/10.1
(58) Field of Classification Search .................. None
See application file for complete search history.

(56) References Cited

U.S. PATENT DOCUMENTS

| 5,280,159 | A | 1/1994 | Schultz et al. |
| 6,247,057 | B1 | 6/2001 | Barrera |
| 6,483,433 | B2 | 11/2002 | Moskowitz |
| 6,507,869 | B1 | 1/2003 | Franke et al. |
| 6,688,522 | B1 | 2/2004 | Philyaw et al. |
| 7,165,722 | B2 | 1/2007 | Shafer et al. |
| 2002/0188506 | A1 | 12/2002 | Smith |
| 2003/0038172 | A1 | 2/2003 | Bodin et al. |
| 2003/0095032 | A1 | 5/2003 | Hoshino et al. |
| 2003/0144926 | A1 | 7/2003 | Bodin et al. |
| 2003/0214928 | A1 | 11/2003 | Chuah |
| 2003/0226887 | A1 | 12/2003 | Komine et al. |
| 2004/0024660 | A1 | 2/2004 | Ganesh et al. |
| 2004/0145472 | A1 | 7/2004 | Schmidtberg et al. |
| 2004/0264441 | A1 | 12/2004 | Jalkanen et al. |
| 2005/0092825 | A1 | 5/2005 | Cox et al. |
| 2005/0093698 | A1 | 5/2005 | Sakamoto et al. |
| 2005/0104719 | A1* | 5/2005 | Ramamurthy et al. ...... 340/10.1 |
| 2005/0108076 | A1 | 5/2005 | Carrender et al. |
| 2005/0137904 | A1* | 6/2005 | Lane et al. ........................ 705/1 |

FOREIGN PATENT DOCUMENTS

| JP | 2003-108452 | 4/2003 |
| JP | 2003-157477 | 5/2003 |
| WO | WO02/27623 | 4/2002 |
| WO | WO 2004/013731 | 2/2004 |

OTHER PUBLICATIONS

Engels et al., The Networked Physical World: An Automated Identification Architecture, Second IEEE Workshop on Internet Applications, Jul. 23-24, 2001, p. 76-77, San Jose, CA.
Engels, David, A comparison of the Electronic Product Code Identification Scheme & the Internet Protocol Address Identification Scheme, Auto-ID Center MIT, Jun. 1, 2002, p. 1-7.
Fritsche, et al., "Mobile IPv6: Mobility Support for the Next Generation Internet," IABG, (http://www.ipv6forum.com/navbar/papers/MobileIPv6_Whitepaper.pdf), Aug. 2003.
Hilliard, et al, Electronic Product Codes, Odin Technologies Laboratory, Sep. 15, 2003, p. 1-8, Reston VA.

(Continued)

*Primary Examiner* — F. Ryan Zeender
*Assistant Examiner* — Faris Almatrahi

(57) ABSTRACT

A method, identification tag, data signal, and service for asset management are disclosed. Identification data may be retrieved from an identification tag. The identification data may include a first data element comprising a global routing prefix and a second data element comprising an asset identifier. Based on the global routing prefix, a uniform resource locator may be determined for a selected asset lookup service. Based on the determined uniform resource locator, the received asset identifier may be sent to the asset lookup service.

18 Claims, 12 Drawing Sheets

OTHER PUBLICATIONS

Johnson, et al., "Mobility Support in IPv6," IETF draft request for comments, (http://www.ietf.org/internet-drafts/draft-ietf-mobileip-ipv6-24.txt), Jun. 2003.

Military's RFID Alternative: IPv6, RFID Journal, Oct. 13, 2003, http://216.121.131.129/article/articleprint/609/-1/1/.

Waldrop, et al., Colorwave: A MAC for RFID Reader Networks, IEEE Wireless Communications and Networking conference, 2003, p. 1701-1704.

European Patent Office, "European Search Report", for European Patent Application No. 05101812.05, Jan. 19, 2006.

ONS Working Group, "Auto-ID Object Name Service (ONS) 1.0", Auto-ID Center Working Draft, Aug. 12, 2003, Auto-Id Center.

Hiranaka Y. et al., "Multimedia and Routing Specific Applications on IPv6 Networks", Proceedings of the 2004 International Symposium on Applications and the Internet Workshops (SAINTW'04), Jan. 26, 2004, pp. 123-126, Piscataway, USA.

European Patent Office, "European Search Report", for European Patent Application No. 05101811.7, Jan. 20, 2006.

Uo Y. et al., "White Paper: Internet and Auto-ID Architecture", Oct. 1, 2003, Auto-ID Center.

Ohta K. et al., "Adaptive Terminal Middleware for Session Mobility", Proceedings of IEEE Multimedia Signal Workshop in 2002, IEEE May 19, 2003, pp. 394-399, Piscataway, USA.

\* cited by examiner

| Global Routing Prefix 604 | Asset Lookup Service URL 38 |
|---|---|
| 3FFE:2900:D005 | 3AAE:2800:G004:231DA:002A:00FF:FE28:9C5A |
| 3FFE:2900:D005 | 3FFE:2900:D005:231DA:002A:00FF:FE28:9C5A |
| 3FFE:FFFF | 3FFE:2900:D005:211DA:003A:00EF:FE27:9D1A |

*Fig. 12*

METHOD AND IDENTIFICATION TAG FOR ASSET MANAGEMENT

FIELD OF THE INVENTION

This application is directed to methods and systems of asset management, and more particularly, to methods and systems of identifying assets using radio frequency identification ("RFID").

BACKGROUND OF THE INVENTION

Various methods of labels and tags have been used to identify assets, particularly to track products in transit or as they are being purchased by a consumer, including for example, Uniform Product Codes ("UPC"), Serialized Shipping Container Codes ("SSCC"), International Standard Book Numbers ("ISBN"), magnetic cards, integrated circuit ("IC") cards, and radio frequency identification ("RFID") tags. These tags, when read and translated, identify some property of the asset which may be used to track, collate, manage or convey the assets in the asset management system. The identification data may be stored in the tag in a private format, but to improve interoperability, the EPCglobal organization (Electronic Product Code organization) has developed a standard format for the RFID numbers.

As shown in FIG. 1, the electronic product codes ("EPC") 500 are typically 96 bits wide and include a version number 502, a manager number 504 that identifies the producer of the asset, an object class 506 that identifies the type of asset (such as a SKU), and a serial number 508 that distinguishes each individual tag. In addition to the 96-bit EPC, various other EPC formats have been proposed including a 256-bit EPC. The EPC is typically stored on a RFID tag 514 (shown in FIG. 2) including a microchip or IC with an attached antenna.

To resolve the EPC into product information, a reader 510 sends a radio frequency signal 512 querying any identification tags 514 in range, as shown in FIG. 2. An active identification tag 514a has a battery to run the IC to broadcast a reply to the reader, and a passive tag 514b draws power from the sent signal 512 to reply. Either reply 518 to the reader will include the tag's EPC 500a, 500b. The reader then communicates with a Savant computer system 516, which is a form of distributed software specified by the Massachusetts Institute of Technology Auto-ID Center (now a part of EPCglobal). The reader may be physically connected to the Savant computer and/or may be a mobile reader which communicates with the Savant computer system either through a wireless connection, such as "Wi-Fi", or may download a batch of received EPC's when physically connected to the Savant computer system and/or the network, such as through a docking station. The Savant computer system sends the received EPCs 500a, 500b to an Object Name Service 524. The Object Name Service 524 then returns an address 520a, 520b for a Product Markup Language ("PML") server 526 containing asset information 522 for each given EPC. Using the received address, the Savant computer system may contact the PML server 526 to retrieve and/or update the asset information 522.

SUMMARY OF THE INVENTION

The EPC numbering system described above, although feasible, is not compatible with existing numbering systems such as SSCCs and ISBNs. Even further EPCs are not compatible with current or proposed computer communication protocols. Thus, in the prior art, a single company may maintain multiple numbering systems depending on the asset being tracked.

Embodiments of the invention are directed toward identification tags and asset management methods which are compliant with computer protocol addressing schemes. Specifically, the asset identification tags may reply to a query from a reader with identification data which comprises a global routing prefix of an Internet Protocol address and an asset identifier. The global routing prefix may be identical to the Internet Protocol address global routing prefix of the asset manufacturer, the tag manufacturer, or an entity maintaining the asset information for asset management, or any other entity. Based on the global routing prefix, the reader system or other computer system may determine a uniform resource locator (URL) for a selected asset lookup service, and based on the determined URL, the reader may send the received asset identifier to the asset lookup service. In this manner, the global routing prefix becomes a paradigm for a universal lookup system for both IP routing of packets and for asset identification. Moreover, identification tags compliant with IP addressing schemes may allow future packet communication directly with the ID tag as tags increase in computing capability. In addition the identification tags will fall within a settled standard with its attendant reliability and security.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 12 is a diagram of an example table for a database of URLs in one embodiment;

DETAILED DESCRIPTION

While the preferred embodiment of the invention has been illustrated and described, it will be appreciated that various changes can be made therein without departing from the spirit and scope of the invention.

Figure 1:
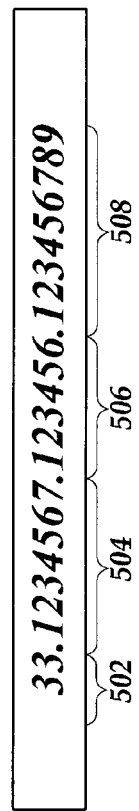
FIG. 1 is a table of an example EPC of the prior art.
Figure 2:
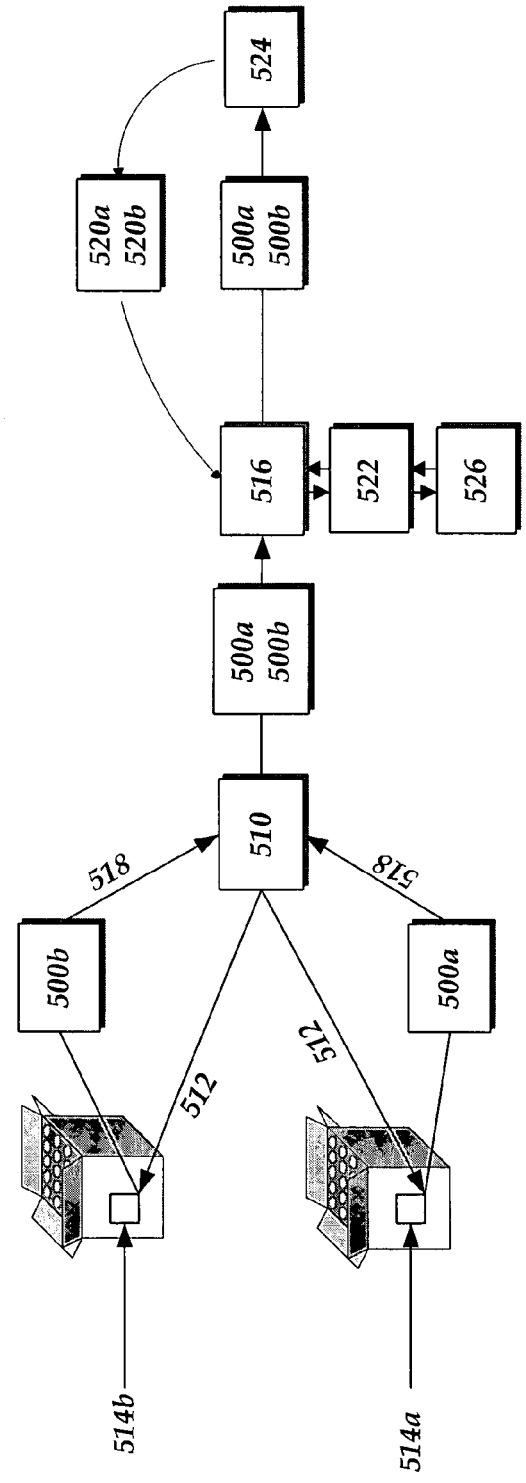
FIG. 2 is a dataflow diagram of an example EPC system of the prior art.
Figures 3, 4, 5:
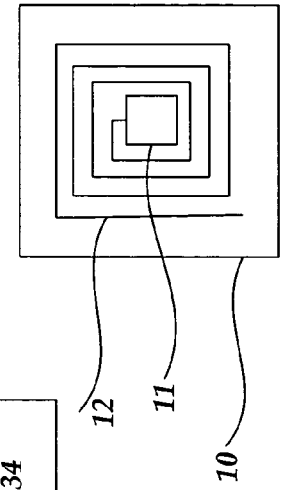
FIG. 3 is a table of an example Internet Protocol version six address of the prior art.
FIG. 4 is a diagram of an example asset identification tag in one embodiment.
FIG. 5 is a diagram of an example asset identification tag data structure in one embodiment.

Internet addresses identify a specific location on the Internet to assist in routing packets to a host system or end user. For example, Internet Protocol version 6 ("IPv6") is administered by the Internet Corporation for Assigned Names and Numbers, which establishes policies both for domain names and numeric addresses. The numeric IPv6 address 600, shown in FIG. 3, is a 128 bit quantity divided into two parts. The first part, a subnet prefix 602, is typically 64 bits wide and specifies an individual subnet within the site of an end user. The subnet prefix 602 is further divided into two fields. The first portion (typically 48 bits wide) is called the global routing prefix 604 or public address which indicates a specific end user's site on the Internet. The second portion, the site subnet identification ("ID") 606, occupies the remaining portion of the subnet prefix 602 and indicates the subnetwork location of the end user within the site indicated by the global routing prefix. The second part of the IPv6 address, typically 64 bits, is designated the interface identification ("ID") 608 and specifies a particular device on the indicated subnet.

Any entity wishing to support networked end users must register with an Internet Service Provider ("ISP") or Local Internet Registry, and in return will receive a global routing prefix (typically 48 bits). The remaining 80 bits of the IPv6 address 600 are designated by the entity to form a private address space for its supported end user systems within the protocol restrictions of IPv6. For example, IPv6, in a modified EUI-64 format, requires that the seventh bit of the first byte of the Interface ID be either a 1 if the address is global, i.e., assigned by IEEE, or 0 if the Interface ID is local, i.e., assigned by an entity other than IEEE. IPv6, in a modified EUI-64 format, also requires that the eighth bit of the first byte of the Interface ID be a 1 if more than one device shares the ID or 0 if a single device uses the Interface ID. Thus, for a device with a unique Interface Address assigned by the host support entity, the seventh and eighth bits are 00 to comply with EUI-64 format conditions, and the remaining 78 bits may be assigned by the support entity as it wishes to define the subnet and interface identification. It is to be appreciated that the assigned global routing prefix may have only 47 or 46 bits, or any other issued bit width, and thus, the remaining bits in a 128 bit IPv6 address may be designated for internal use, and consequently, provide a larger private address space.

Entities exercising asset management also support various computer systems connected to the Internet, and thus, these same companies already have assigned global routing prefixes with a private address space identifying subnets and individual hosts in each subnetwork. Under the prior art EPCglobal system for RFID, an asset manager must register and use a unique EPC manager number to identify its products, which is distinct from its global routing prefix issued by its ISP for providing an address on the Internet. In the embodiment shown in FIG. 4, the asset manager may use its existing, or newly acquired, global routing prefix as a portion of a data structure on an identification tag to identify assets for asset management. In this manner, the global routing prefix is used as part of the typical Internet Protocol address scheme as well as to identify asset under management. As illustrated, the data structure stored on the RFID tag may also comply with IPv6 address format constraints. It is to be appreciated that other versions of Internet Protocols and other computer addressing schemes may be suitable for identifying assets in an asset management method.

As shown in FIG. 5, the RFID tag 10 includes an information storage device 11 such as a microchip and an antenna 12 which may be integrated into or separate from the microchip. If the tag 10 is an active system, it may also include a battery (not shown). Although the illustrated embodiment is described with reference to RFID tags, it is to be appreciated that many devices may be suitable to store identification tag information, including, but not limited to, bar codes, magnetic strips and numeric codes. Additionally or alternatively, it is to be appreciated that many devices may be suitable to communicate the stored data, including, but not limited to, magnetic readers, optical readers, electronic readers or visual inspection.

The storage device 11 stores a data structure 14 for use in identifying an associated asset. FIG. 4 illustrates one example of a data structure compliant with a standard network protocol for storing and/or communicating identification data from an identification tag. As shown in FIG. 4, the data structure 14 may include a first data field 15 containing data representing the global routing prefix 604 which is compliant with standard Internet Protocol addressing schemes. Under IPv6 in the prior art, the site subnet identifies the subnet for routing to the end user and the interface identification identifies the particular host on the subnet. However, since the site subnet and interface identification are not needed to identify a subnet or host on a network, those data fields, in one embodiment, may be used to store identification information for an asset, such as for asset management. For example, the second data field may be set to a predetermined and/or fixed value representing a tag index 16. The global routing prefix registrant may then designate a single predetermined and fixed value to the tag index, thus, reserving a branch of the available private address space to contain asset identification information. In this manner, the second field 17 of the IP address holding the value of the tag index 16 would no longer indicate a routing location for packets, but would rather indicate that the IP address itself contained identification information about an asset. In one example, the tag index contains 16 bits which are all set to 1, e.g., FFFF in hexadecimal notation. It is to be appreciated that the tag index may contain more or fewer bits, either allowing for alternative field sizes for the global routing prefix and/or the interface ID fields within or outside the IP address format. Other tag indexes may include FF (only 8 bits) or any other predetermined code of any length which may indicate that the data structure, an IP address in this embodiment, contains asset information rather than routing information.

As shown in the illustrative example, the third data field 18 contains data representing an asset identifier 20 which indicates a property of the asset rather than an interface identification indicating a particular host on a network. In this manner, the Interface ID field 18 holding the asset identifier is independent of a routing location on the Internet. The asset information may include, for example and without limitation, a product code, a serial number, a shipment number, a manufacturing date, a batch number, a version number, a manufacturing or shipping facility identifier, a name or contact information such as a URL or phone number. As shown in FIG. 4, the asset identifier 20 may include an asset type identifier 22 and a serial number 24. The asset type identifier 22 may indicate a general property of the asset which is common to multiple assets, for example, the type of asset, e.g., a 12 amp vacuum cleaner; the size or weight of the asset, e.g., a container carrying 25 tons of cargo; a product model or version, e.g., Windows® version 1.0; a personnel pass for access to particular areas; the color and/or size of a type of apparel, e.g., a large red shirt; a logistics unit of at least one asset, e.g. a container, pallet, or case of asset(s); geographic location for distribution or manufacture, e.g., Windows® for Japanese users; personal information and/or credit charge data for product purchase; entry and exit time for vehicle toll payment; and/or any other property or descriptor of an asset under management. In this manner, the same data structure may be used for asset management of not only single assets (like the EPC), but also shipping units (like the SSCC) and/or other asset management systems. The serial number 24 may indicate a specific and unique asset within that asset type e.g., Windows® version 1.0 with product serial number AB123456XYZ; the asset geographic location, e.g., distribution center in Peoria; the asset age or manufacture date; or an asset environment descriptor, e.g., the current temperature of the tag 10.

In the illustrative example, the asset type indicator 22 contains 24 bits of data, and consequently 40 bits remain in the Interface ID for the serial number. Twenty-two bits of data for the asset type indicator theoretically allows 16 million asset type indicators and the 40 bits of data for the serial number allows 1 trillion unique serial numbers. However, under the constraints of IPv6, the seventh and eighth bits of the interface ID should be set to 00 to indicate that the Interface ID is an asset identifier 20 (here the asset type identifier and the serial number) not set by IEEE and is unique (not shared). Accordingly, there is a small limitation with the allocated 24 bits of data for the asset type identifier, and thus, the number of unconstrained bits in the interface ID is 22. It is to be appreciated that other lengths of data may be suitable for the asset type indicator including 32 bits, with a resultant decrease in the available asset identifier field to 32 bits to comply with the 64 bit Interface ID field, or any other bit length providing a suitable numbering space for the asset under management.

Although the above example is discussed with reference to a data structure 14 compliant with a Mobile IPv6 address format, it is to be appreciated that other versions of Internet Protocols and other computer addressing schemes may be suitable for identifying assets in an asset management method and include message authentication code ("MAC") addresses, 64-bit extended unique identifier (EUI-64) or any addressing format. Moreover, it is to be appreciated that the data structure 13 may not comply with any IP address format while containing a global routing prefix, an asset identifier and/or any other asset information placed in predetermined fields or bits. For example, the tag index may be any suitable predetermined field of bits in a standard IP address or any other data structure.

Figure 6:
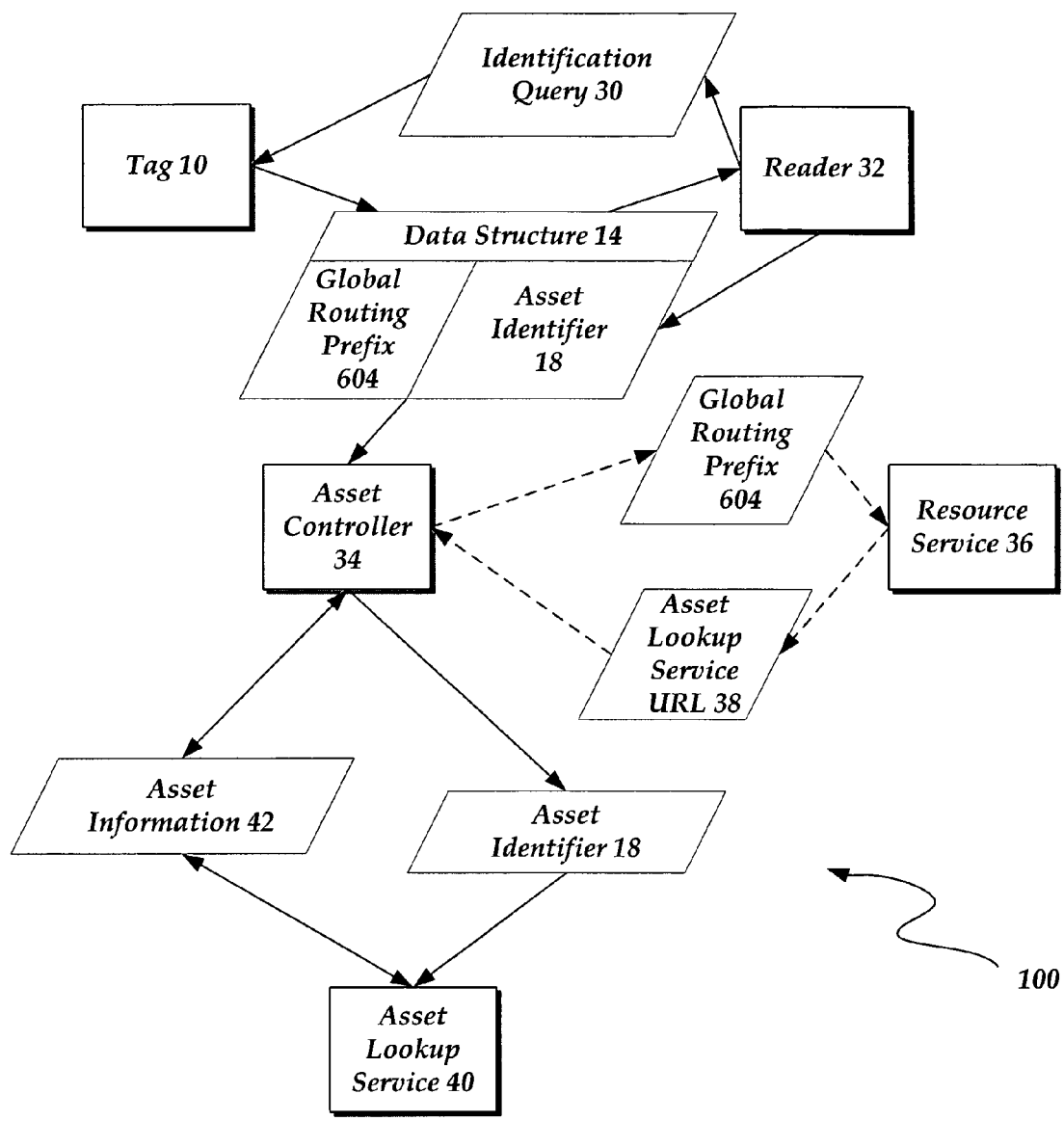
FIG. 6 is a dataflow diagram of an example asset management method in one embodiment.

FIG. 6 illustrates an example asset management system 100. Asset management, as noted above, identifies assets and includes but is not limited to tracking retail or wholesale products in transit or as they are being purchased by a consumer, tracking payment of tolls by vehicles at a tollbooth, allowing or denying access to personnel, identifying and/or tracking pets, identifying and/or tracking parolees, etc. There are many different kinds of asset management systems which differ in what assets are being identified and how they are tracked. Moreover, there may be different asset managers over the complete lifetime of the asset, and moreover, there may be multiple asset managers at the same time interested in the same asset. For example, an asset manufacturer may attach an identification tag 10 to a manufacturing part to track the manufacturing process, address any bottlenecks or other manufacturing concerns, and/or track assets through retail sale for recall and/or marketing purposes. A distributor may monitor the identification tag 10 attached to the finished asset and/or a logistics unit of assets from the manufacturer to delivery at a retail outlet by the distributor. A retail outlet may monitor the same asset through the distribution process, monitor the asset as inventory in its warehouse and stock on its store shelves to assist in restock and check out. A purchaser may also practice asset management in tracking items at locations and or tracking the age/freshness of items in storage.

As shown in FIG. 6, the asset management system resolves the data stored on the tag 10 with a reader 32. Like the prior art EPC system, a reader 32 may interrogate the tag 10 by sending an identification query 30. The query may be any data or signal indicative of a query to an identification tag to respond with its stored identification data. The identification tags within the reader's field may respond with the data stored in the data structure 14. As shown in the illustrative example of FIG. 6, the received data structure 14 may contain at least a global routing prefix 604 rather than an EPC issued manager number, and an asset identifier 20. Under RFID, the reader sends a signal through a transceiver over a frequency communication channel which is detected by the tags within its frequency transmission range. The signal may be unmodulated or modulated, matching the capabilities of the identification tags 10 under interrogation.

Although any radio frequency may be suitable for use with RFID, frequency transmissions are regulated by the FCC. Thus, according to International Standard Organization standards for RFID within the unlicensed bands of the FCC, high frequency transmissions will typically occur at approximately 915 MHz or 13.36 MHz, low frequency transmissions will typically occur at approximately 125 kHz and microwave radio transmissions will typically occur at approximately 2.46 GHz or 5.8 GHz. Other frequencies may be appropriate, including sonic, optical, infrared, and ultraviolet. Communication methods, other than RFID, may also be suitable with various storage devices, including magnetic readers, visual inspection, laser readers, etc. Depending on the exact technology and system configuration, anti-collision methods may be used to allow a reader to read more than one tag within its range as well as allow multiple readers to interrogate adjacent or identical tags.

The identification data received from the identification tag may include, as noted above with reference to FIG. 4, a global routing prefix and an asset identifier which may include an asset type indicator and/or serial number. The identification data may also include an optional tag index. The identification data may be stored and/or communicated to the reader in any suitable format. For example, the identification data may be stored and/or communicated in a data structure which is compliant with a standard Internet Protocol address, such as the Mobile Internet Protocol version 6 address format shown in FIG. 4.

The reader then communicates the received data structure 14 information (a global routing prefix with associated asset identifier) to an asset controller 34. The asset controller 34 then determines a URL 38 for a selected asset lookup service for each received global routing prefix. The asset lookup service 40 maintains a database which stores the asset identifiers 20 for a given global routing prefix 604. Associated with each asset identifier 20 is asset information 42 for asset management, which as noted above, may include an asset type indicator and/or serial number.

The asset controller 34 may access the asset lookup service 40 and retrieve asset information 42 for a given asset identifier 20 to provide asset management. Additionally or alternatively, the asset controller may access the asset lookup service to update asset information 42. The asset information 42 may be any data or signal indicative of the asset information, for example, the information may be incorporated into a dynamic serial number with fields indicating static information (e.g., asset type or name), dynamic information (e.g., asset environment measurements), temporal asset information (e.g., asset location, sales status, etc.), and/or other asset information which may be independent of the asset and/or the asset identifier 20. The asset information may be received by the asset controller and/or the asset lookup service in any number of ways, including but not limited to, any data or signal discernable by the asset controller and/or asset lookup service as asset information, such as a message in any format of any computer communication protocol.

To support asset management, in one example, the asset manager may set up an IP address with its global routing prefix and the predetermined site subnet ID and Interface ID to point to its selected asset lookup service. To determine the URL 38 for the asset lookup service 40, the asset controller may self determine the URL by combining the received global routing prefix 604 with the predetermined site subnet ID and Interface ID. For example, the asset controller may append a predetermined suffix, such as ALS.aspx, to the received global routing prefix to format the URL for the asset lookup service.

Alternatively, as shown in FIG. 6, the asset controller 34 may resolve the global routing prefix to a URL for an asset lookup service by interrogating a predetermined resource service 36. For example, the asset controller may contact a predetermined URL pointing to the resource service 36. The resource service correlates each registered global routing prefix 604 with a URL 38 provided by the asset manager controlling the asset. In this manner, the resource service 36 returns a URL for each provided global routing prefix. In one example, the resource service includes a provider of the Universal Description, Discovery, and Integration Business Registry ("UBR"). UBRs are currently operated by International Business Systems, Microsoft, and SAP. It should be recognized that various server systems may maintain a resource database correlating each global routing prefix with the URL for the selected lookup service provider, including the asset controller itself.

An example implementation of an asset management method will now be described with reference to FIGS. 7-15.

The reader 32, asset controller 34, asset lookup service 40 and resource service 36, illustrated in FIG. 6, all may be present and operating on one or more computers or other devices acting as a server computer for the identification tag 10. However, in the illustrated embodiment, the reader 32 and asset controller 34 are an integrated system, herein called the reader system 200 which will be discussed below with reference to FIGS. 7-8 and 13. In the illustrated embodiment, the asset lookup service 40 is provided by an asset lookup server 300 (discussed below with reference to FIGS. 9-10 and 14) and the resource service 36 is provided by a resource server 400 (discussed below with reference to FIGS. 11-12 and 15). The asset lookup server 300 and the resource server 400 may be networked systems accessed by the reader system 200 in any manner known in the art (e.g., via the Internet).

Figure 7:
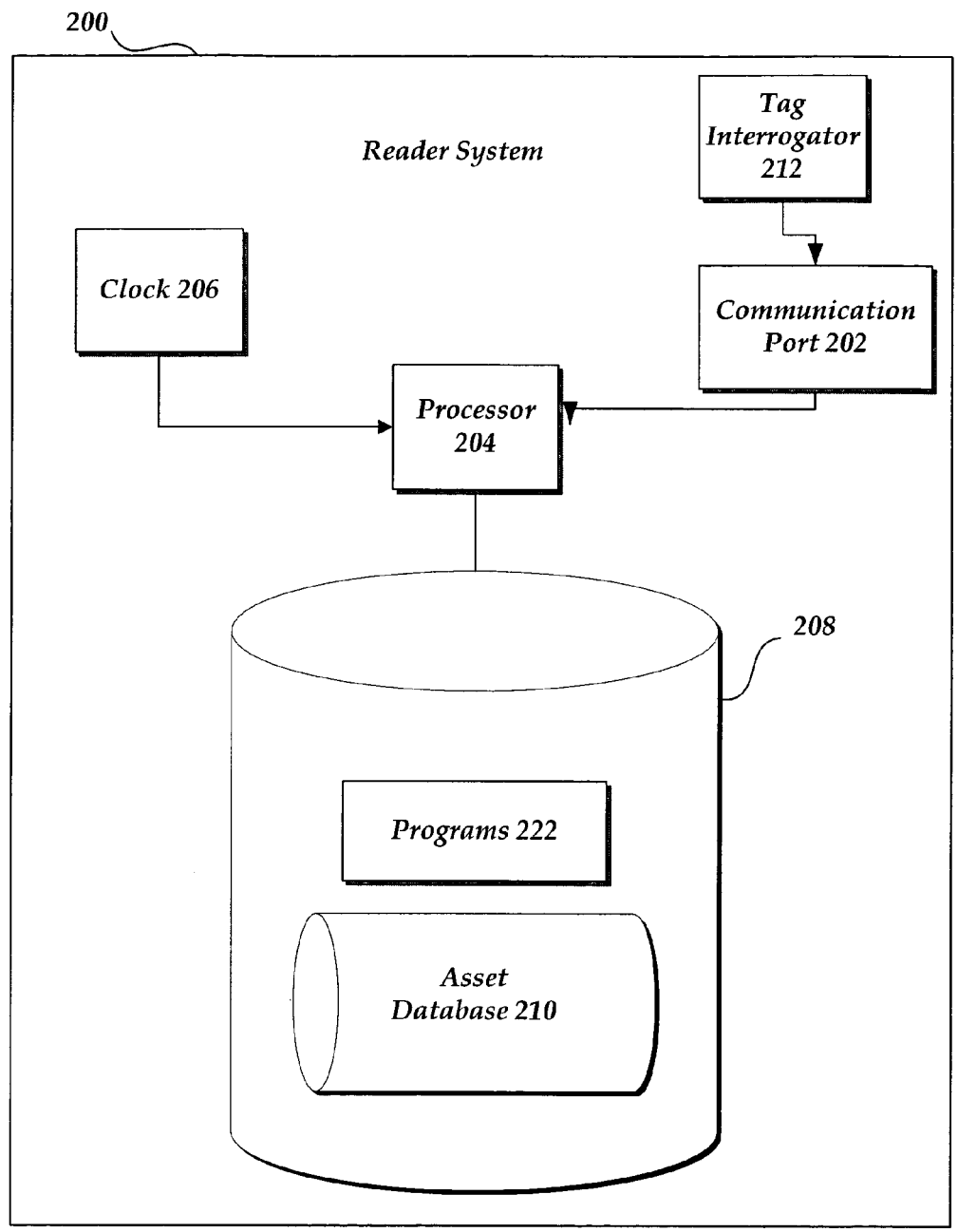
FIG. 7 is a diagram of an example reader system in one embodiment.

As shown in FIG. 7, the reader system 200 may include one or more communication ports 202 which may include a tag interrogator 212 such as a transceiver, magnetic strip reader, laser reader, optical character recognition device, or other device suitable to determine tag information from tag 10. The reader system 200 also includes one or more processors 204, an internal date and time clock 206, and storage 208 which includes one or more computer programs 222 defining instructions, which when executed, instruct the computer to perform the operations of the reader and asset controller. The storage also may include an asset database 210. The asset database will now be described in more detail in connection with FIG. 8 and the programs 222 will be discussed further below with respect to FIG. 13.

Figure 8:
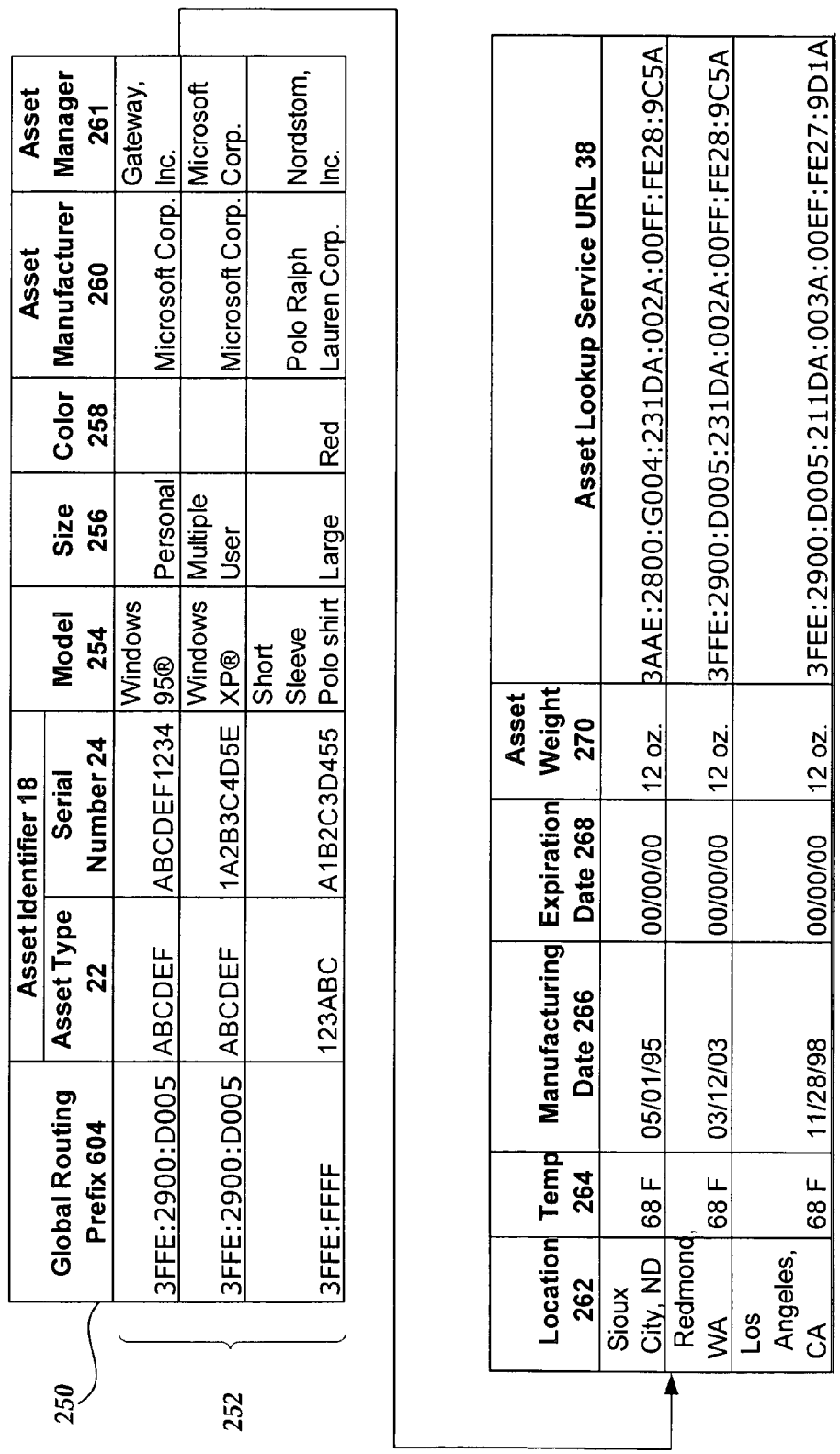
FIG. 8 is a diagram of an example table for a database of assets in one embodiment.

FIG. 8 illustrates an example table 250 for the asset database 210, which includes one or more records 252. In general, each record associates a global routing prefix 604 with at least one asset identifier 20, and optionally, additional information about the asset. In this example, each record 252 includes a global routing prefix 604, an asset identifier 20 including an asset type identifier 22 and a serial number 24, a model 254, size 256, color 258, asset manufacturer 260, asset manager 261, location 262, temperature 264, manufacturing date 266, expiration date 268, asset weight 270, and asset lookup service URL 38. Additional data that may be stored in the asset database is further described in co-pending application titled METHOD AND SYSTEM FOR COMMUNICATING WITH IDENTIFICATION TAGS, filed Mar. 10, 2004, and having Ser. No. 10/798,754, which is incorporated herein by reference in its entirety. Entries in the asset database are initialized by the reader system as it receives a global routing prefix 604, asset identifier 20 and/or other information from each tag 10. The asset lookup service URL 38 is initialized and updated by either the reader system or the resource service 36 (when existing). Some data may be initialized and updated as the asset lookup service 40 provides the asset information 42 when given a specific asset identifier. Dynamic data, including asset environment such as temperature, etc. and temporal data, such as asset location, may be updated by the reader system as it determines or receives that information.

Figure 9:
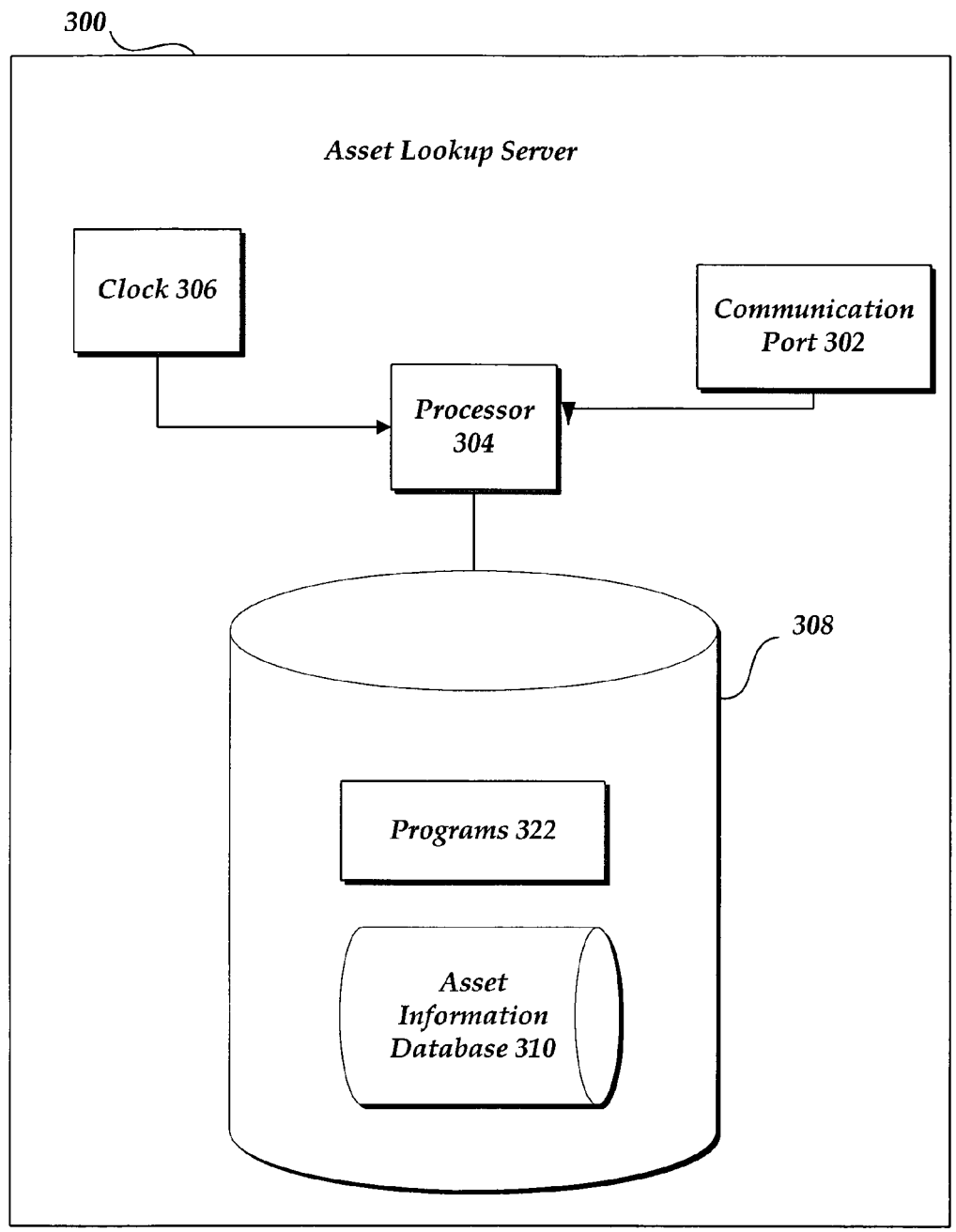
FIG. 9 is a diagram of an example asset lookup server in one embodiment.

As shown in the example embodiment of FIG. 9, the asset lookup server 300 hosting the asset lookup service 40 may include one or more communication ports 302, one or more processors 304, an internal date and time clock 306, and storage 308 which includes one or more computer programs 322 defining instructions, which when executed, instruct the computer to perform the operations of the asset lookup server. The storage 308 also may include an asset information database 310. The asset information database will now be described in more detail in connection with FIG. 10 and the programs 322 will be discussed further below with respect to FIG. 14.

Figure 10:
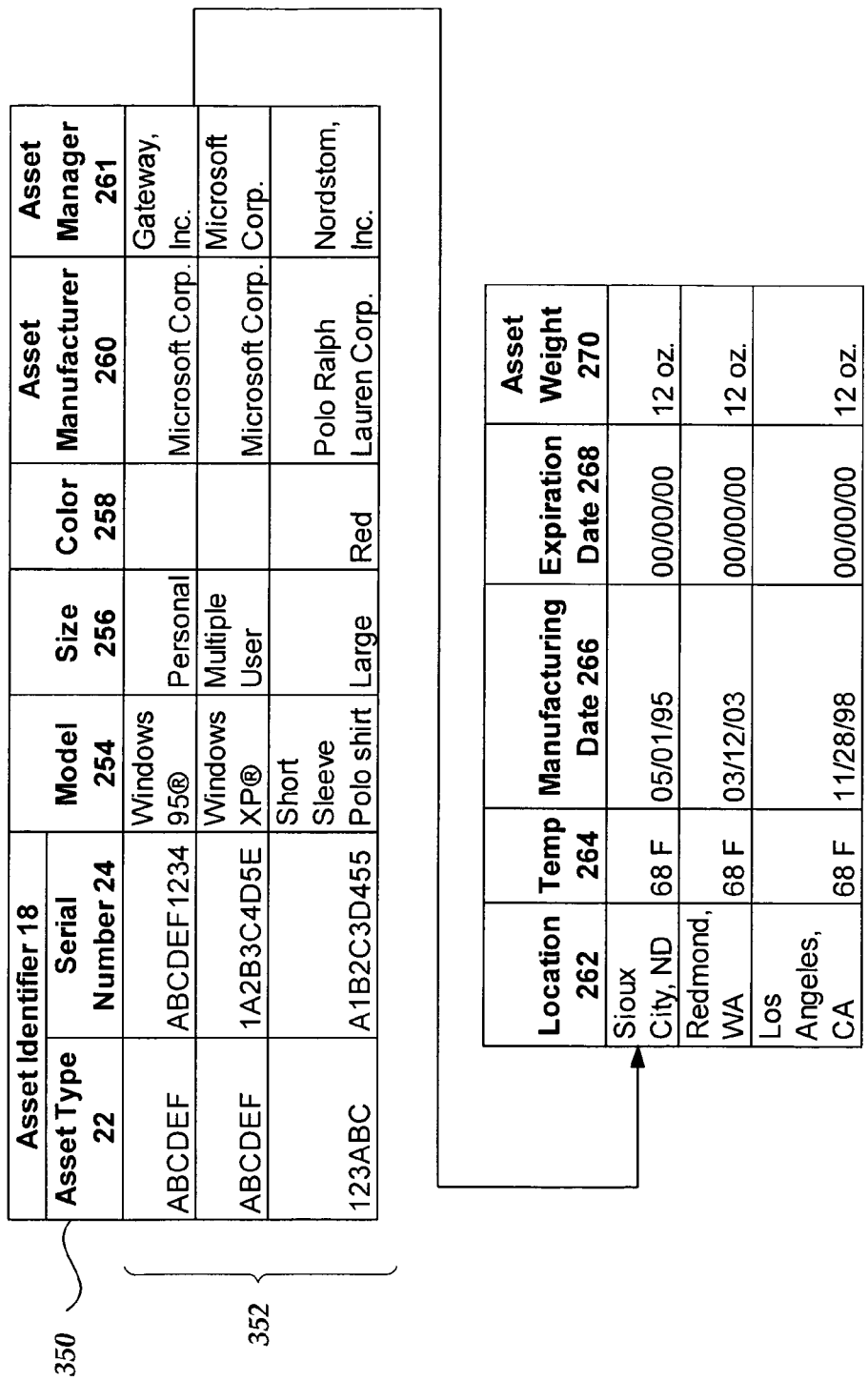
FIG. 10 is a diagram of an example table for a database of asset information in one embodiment.

FIG. 10 illustrates an example table 350 for an asset information database 310, which includes one or more records 352. In general, each record associates an asset identifier 20 with specific static, temporal, dynamic and/or other asset information. In this example, each record 352 includes an asset identifier 20 including an asset type identifier 22 and a serial number 24 associated with a model 254, size 256, color 258, asset manufacturer 260, asset manager 261, location 262, temperature 264, manufacturing date 266, expiration date 268, and asset weight 270. Entries of static, temporal, dynamic and/or other information in the asset information database may be initialized by the asset manager as the identification tag 10 is associated with a particular asset. As noted above, a particular asset may have multiple asset managers interested in identifying and/or tracking the asset over the lifetime of the tag. Thus, as the asset manager changes through the lifetime of the asset, the temporal and dynamic asset information database records may be updated by an asset manager based upon information received from the reader system or other system.

Figure 11:
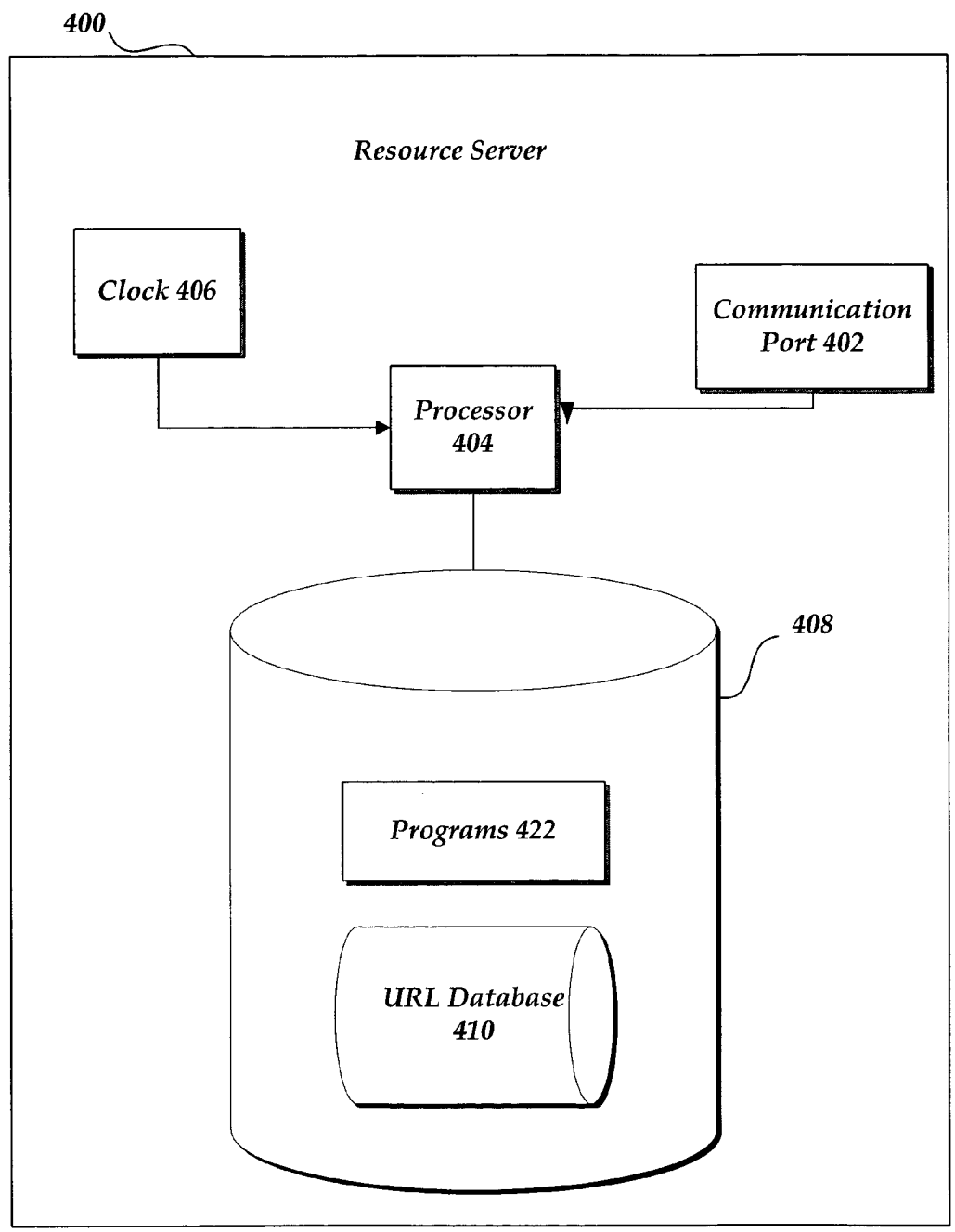
FIG. 11 is a diagram of an example resource serve in one embodiment.

As shown in the example embodiment of FIG. 11, the resource server 400 hosting the resource service 36 may include one or more communication ports 402, one or more processors 404, an internal date and time clock 406, and storage 408 which includes one or more computer programs 422 defining instructions, which when executed, instruct the computer to perform the operations of the resource server. The storage also may include a URL database 410. The URL database will now be described in more detail in connection with FIG. 12 and the programs 422 will be discussed further below with respect to FIG. 15.

FIG. 12 illustrates an example table 450 for URL database 410, which includes one or more records 452. In general, each record associates a global routing prefix 604 with the associated asset lookup service URL 38. Entries in this database are made by the asset manager as the global routing prefix is first associated with an identification tag 10. However, as noted above, the asset manager may change over the lifetime of the asset, e.g., manufacturer, distributor, retailer, purchaser, etc. To address this need, some identification tags are read/write capable, which allows the new asset manager to write its own global routing prefix and selected asset identifier to the identification tag 10. However, simpler, and cheaper, identification tags may be read-only tags, where the data structure including the global routing prefix and the asset identifier are written to the tag only once. In one example, the manufacturer may store its own global routing address on each tag that it manufactures; however, the manufacturer's asset lookup service then may be required to store the asset information for each and every tag through the lifetime of the tag. Alternatively, the purchaser of the identification tags from the tag manufacturer, e.g., the asset manufacturer, may request that the purchased tags be written with the global routing prefix of the asset manufacturer. In this manner, the asset manufacturer would maintain only those products that it manufactures itself. Asset managers which would like to monitor the asset and tag 10 after leaving the asset manufacturer's control may negotiate with the asset manufacturer to host and allow access to its asset information database to the new asset manager.

As noted above, a global routing prefix is issued by an ISP or Local Internet Registry. When an asset manufacturer changes ISPs, its global routing address may change as a result of the address space allocated to the new ISP. Thus, to continue monitoring the active assets with identification tags 10 which have the old global routing prefix, the asset manager, here the asset manufacturer, may have to negotiate to preserve the URL entry in the resource service and to restrict the use of the old global routing prefix, e.g., no use for RFID purposes, while the assets are still being actively monitored.

Each database described above may be any kind of database, including a relational database, object-oriented database, unstructured database or other database. A database may be constructed using a flat file system such as ACSII text, a binary file, or any other file system. Notwithstanding these possible implementations of the foregoing databases, the term database as used herein refers to any data that is collected and stored in any manner accessible by a computer.

Figure 13:
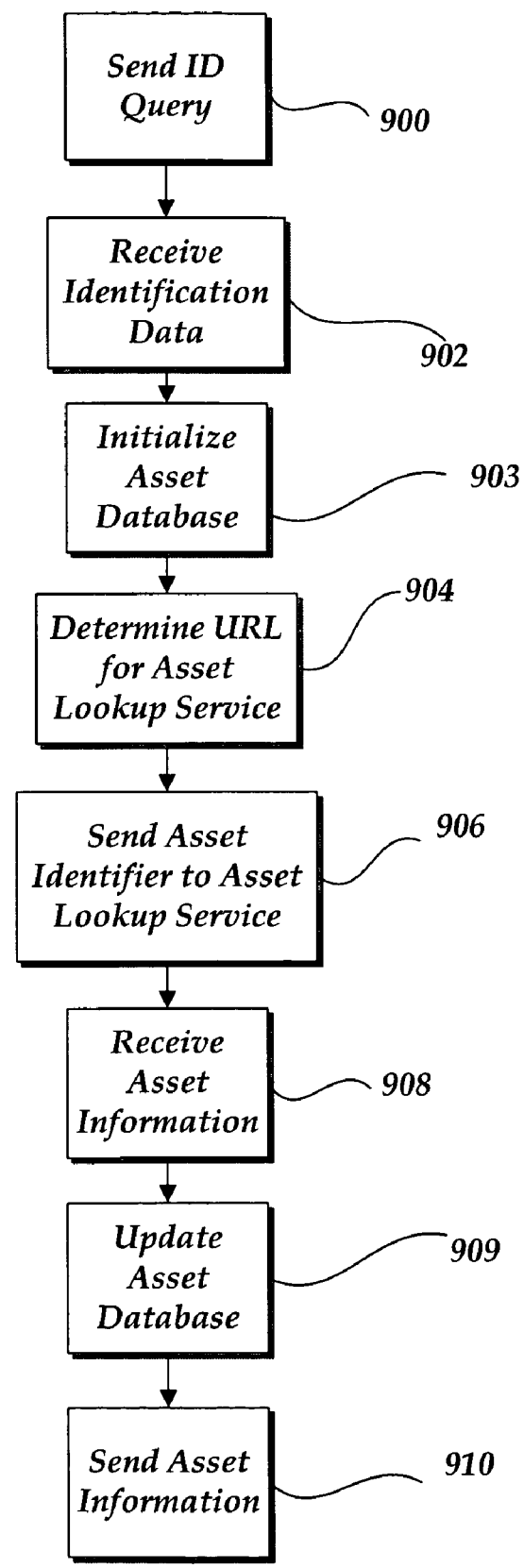
FIG. 13 is a flowchart describing how a reader system is performed in one embodiment.

Having now described the databases maintained by the reader system, asset lookup server, and the resource server in this embodiment, the various operations performed by the reader system 200 will now be described. Referring to FIG. 13, these operations include, but are not limited to, sending 900 an identification query from the reader to the identification tag and receiving 902 identification data from the identification tag. In one embodiment, the identification data includes a global routing prefix 604 and an asset identifier 20 and optionally a tag index 16. A discussed with respect to FIG. 4, the identification data may be stored in a data structure 14 which is compliant with an IP address format. If the reader system 200 receives identification data (in one example, the data structure of FIG. 6) as determined at 902, the reader system 200 initializes the asset database 903. As previously explained, it is to be appreciated that the asset data may be received through any computer readable medium including without limitation modulated or unmodulated frequency signals, magnetic readers, laser signals, or through the Internet. Records in the asset database of FIG. 8 may be created or updated using the received identification data. In one example, the reader system associates the received asset identification data (such as a global routing prefix and/or asset identifier) with other tag information that may be discoverable or known by the reader system.

Referring again to FIG. 13, the operations of the reader system 200 may also include determining 904 a URL for an asset lookup service based on the received asset information. As described above, in some embodiments, the URL 38 of the asset lookup service may be determined by the reader system based upon a received global routing prefix concatenated with a predetermined suffix, such as ALS.aspx. Alternatively, the reader system 200 may contact a resource service 36 (shown in FIG. 6) at a resource server 400 (FIG. 11) to determine the URL 38. The operations of the reader system may also include sending 906 the asset identifier to the site located at the determined URL of the asset lookup service. The reader system may then receive 908 asset information from the asset lookup service stored in the asset information database (FIG. 10) of the asset lookup server 300. Records in the asset database of FIG. 8 are updated (909) by the reader system with the received asset information. In particular, the reader system associates a particular asset identifier 20 with the received asset information 42. As shown in FIG. 10, the asset information 42 may include various combinations of static, temporal, dynamic, and/or other information. In one example, the temporal, dynamic, and/or other information may be determinable or known by the reader system, e.g., the geographic location of the tag, the reader subnet prefix, etc. To update the temporal, dynamic, and other asset information in the asset information database of the asset lookup server, the reader system may send (910) asset information to the asset lookup service. For example, the reader system may send the geographic location of the reader, measurement information taken or received by the reader, such as local temperature, and/or any other data known or determinable by the reader system.

Figure 14:
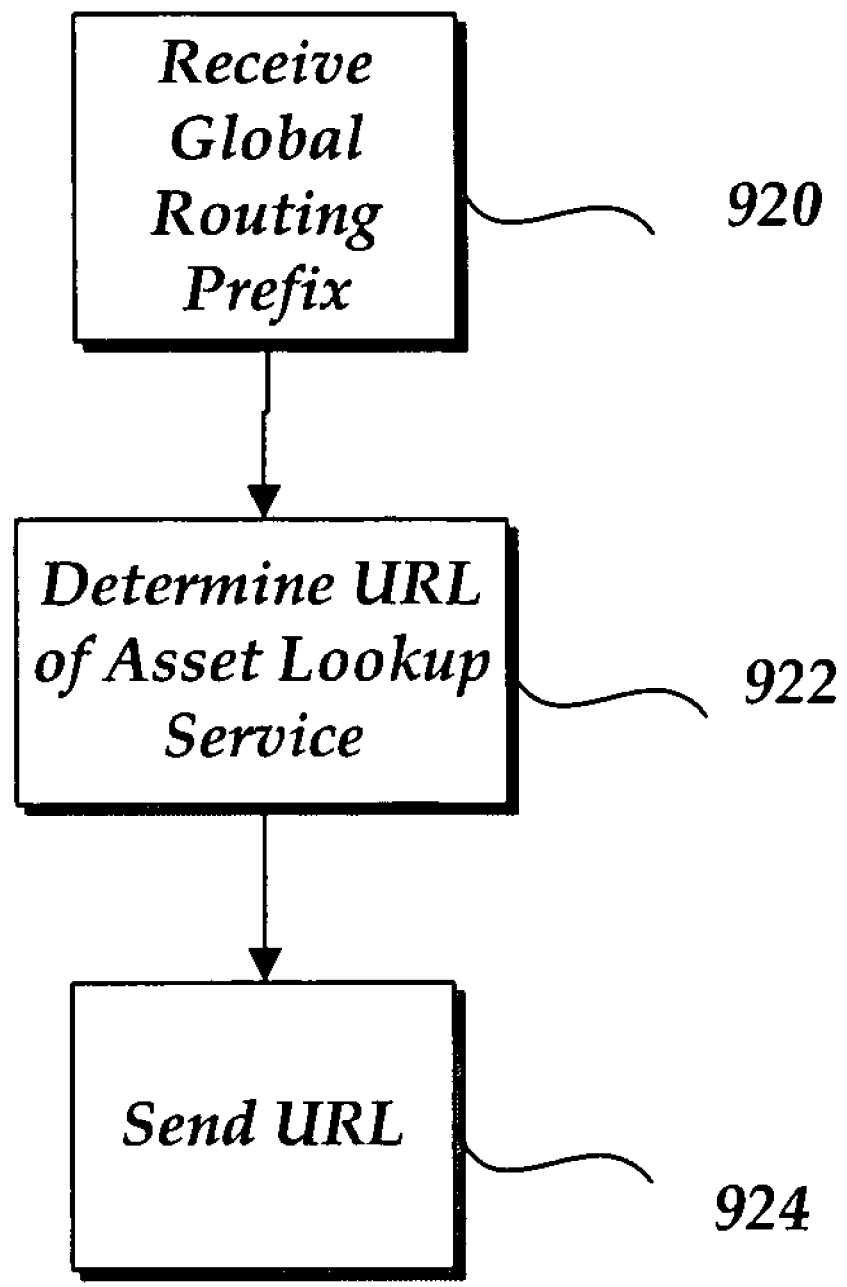
FIG. 14 is a flowchart describing how a global routing prefix may be resolved into a URL for an asset lookup service in one embodiment.

Referring to FIG. 14, the operations of the resource server 400 providing the resource service 36 include, but are not limited to, receiving 604 the global routing prefix from the tag through the reader system 920, determining 922 the URL of the asset lookup service 40 based upon the global routing prefix, and sending 924 the URL to the reader system. As discussed above, the resource server operations may be performed by a UBR.

Figure 15:
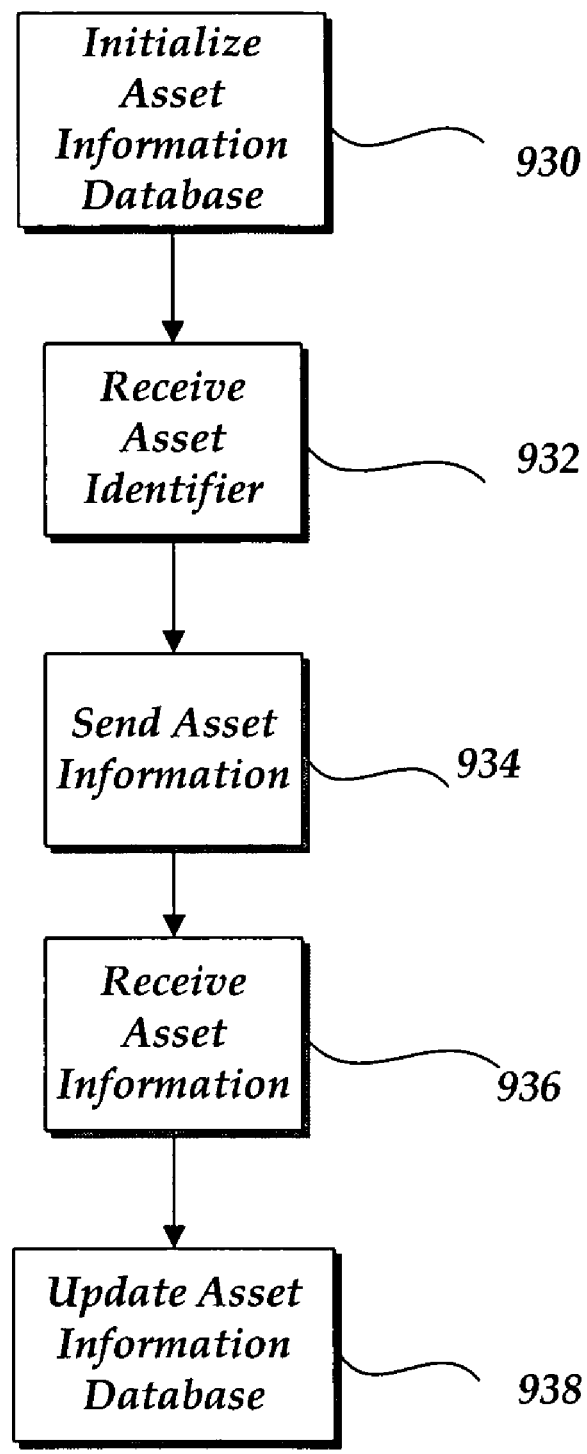
FIG. 15 is a flowchart describing how an asset identifier may be resolved into asset information in one embodiment.

As shown in FIG. 15, the operations of the asset lookup server 300 providing the asset lookup service 40 include, but are not limited to, initializing 930 the asset information database (FIG. 10) by associating the asset identifier of the tag 10 with specific asset information. More particularly, information about the asset is received by the asset manufacturer or other asset manager. Information about the asset, in an embodiment using the database structure above (FIG. 10), may include a global routing prefix, an asset identifier which may include an asset type identifier and/or a serial number, model, size, color, asset manufacturer, asset manager, location of the asset, temperature of the asset, manufacturing date, expiration date, and/or asset weight. Any conventional registration or input process or mechanism may be used to obtain this information. The elements of the asset information database may be provided at once or separately and at different times, allowing an asset manager to update the database when information becomes available. Records in the asset information database of FIG. 10 are created or updated using the received information. In particular, the asset lookup server associates an asset identifier with asset information.

Referring to FIG. 15, the asset lookup server 300 operations also include receiving 932 the asset identifier from the reader system along with a query for asset information. The asset lookup server may then match the received asset identifier with a record in the asset information database. The asset lookup server may then send 934 the associated asset information to the reader system. The asset lookup server operations may also include receiving 936 asset information from the reader system. Specifically, the reader system may retrieve more than a global routing prefix and serial number from the identification tag, including static, temporal, dynamic data, and/or other information. The asset information database may include records for information determined by the reader system, e.g., the geographic location, and/or other information of the tag. If the static, temporal, dynamic, and/or other data needs to be updated or corrected, this information may be received 936 by the asset lookup service to update 938 and maintain the asset information database.

The various operations in FIGS. 13-15 need not be performed sequentially or in the order shown.

The computer system with which the various elements of the reader system, the asset lookup server, and the resource server of FIGS. 6, 7, 9, and/or 11 may be implemented either individually or in combination and typically includes at least one main unit connected to both an output device which displays information to a user and an input device which receives input from a user. The main unit may include a processor connected to a memory system via an interconnection mechanism. The input device and output device also are connected to the processor and memory system via the interconnection mechanism.

The computing devices illustrated in FIGS. 6, 7, 9, and/or 11 and the tag 10 typically include some form of computer readable media. Computer readable media can be any available media that can be accessed by the other computing devices in the asset management system. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing systems in the asset management system. Communication media typically embodies computer readable instructions, data structures, program modules or other data in a modulated data signal such as a carrier wave or other transport mechanism and includes any data in a modulated data signal such as a carrier wave or other transport mechanism and includes any information delivery media. By way of example, and not limitation, communication media includes wired media such as wired network or direct-wired connection, and wireless media such as acoustic, RF, infrared, and other wireless media. Combinations of any of the above should also be included within the scope of computer readable media.

One or more output devices may be connected to the computer system. Example output devices include cathode ray tubes (CRT) display, liquid crystal displays, and other video output devices, printers, communication devices such as a modem, storage devices such as a disk or tape, and audio input. One or more input devices maybe connected to the computer system. Example input devices include a keyboard, keypad, trackball, mouse, pen and tablet, communications device, and data input devices such as audio and video capture devices. The invention is not limited to the particular input or output devices used in combination with the computer system or to those described herein.

The computer system may be a general purpose computer system which is programmable using a computer programming language, such as SmallTalk, C++, Java, Ada, or C#(C-sharp), or other language, such as a scripting language or even assembly language. Various aspects of the invention may be implemented in a non-programmed environment (e.g., documents created in HTML, XML or other format that when viewed in a window of a browser program, render aspects of a graphical user interface or perform other functions). Various aspects of the invention may be implemented as programmed or non-programmed elements, or any combination thereof. The computer system may also be specially programmed, special purpose hardware, or an application specific integrated circuit (ASIC). The reader system may also include a pager, telephone, personal digital assistant or other electronic data communication device.

In a general purpose communication system, the processor is typically a commercially available processor such as the well-known Pentium® processor available from the Intel Corporation. Many other processors are available. Such a processor usually executes an operating system which may be, for example, the Windows 95®, Windows 98®, Windows NT®, Windows 2000® or Windows XP® available from Microsoft Corporation, MAC OS System X available from Apple Computer, the Solaris Operating System available from Sun Microsystems, or UNIX available from various sources. Many other operating systems may be use.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. A method of asset management comprising:
    sending an identification query to an asset identification tag, the asset identification tag having a global routing prefix of an Internet Protocol address and an asset identifier stored therein;
    receiving, from the asset identification tag, the asset identifier and the global routing prefix;
    based on the global routing prefix received from the asset identification tag, identifying a predetermined suffix of a uniform resource locator for a selected asset lookup service of the received global routing prefix;
    appending the predetermined suffix to the global routing prefix received from the asset identification tag to create the uniform resource locator for the selected asset lookup service; and
    based on the created uniform resource locator, sending the received asset identifier to the selected asset lookup service,
    wherein the method is implemented by a processor operating with a computer readable medium.

2. The method of claim 1, wherein the appending is performed by interrogating a predetermined resource service.

3. The method of claim 2, wherein the predetermined resource service formats the uniform resource locator from the global routing prefix and the predetermined suffix.

4. The method of claim 1, further comprising sending asset property information to the selected asset lookup service.

5. A method of asset management comprising:
    sending an identification query to an asset identification tag, the asset identification tag having a global routing prefix of an Internet Protocol address stored therein;
    receiving, from the asset identification tag, the global routing prefix and an asset identifier indicating at least one of: an asset model descriptor, a unique asset serial number, an asset physical location, an asset age descriptor, or an asset environment descriptor; and
    formatting a uniform resource locator by appending a predetermined uniform asset lookup service suffix to the received global routing prefix,
    wherein the method is implemented by a processor operating with a computer readable medium.

6. The method of claim 5, further comprising receiving predetermined fixed data representing a tag index compliant with an Internet Protocol address format.

7. The method of claim 6, wherein the global routing prefix, the asset identifier, and the predetermined fixed data representing the tag index are compliant with an Internet Protocol version 6 address format.

8. The method of claim 5, further comprising, based on the uniform resource locator, sending the asset identifier to an asset lookup service.

9. The method of claim 5, wherein the formatting is performed by a predetermined resource service.

10. The method of claim 5, wherein sending an identification query includes transmitting a modulated data signal over a frequency communication channel.

11. The method of claim 5, further comprising sending at least one of the asset physical location and the asset environment descriptor to an asset lookup service for storage.

12. One or more computer readable storage media storing computer executable instructions which, when executed by one or more processors, perform:
    receiving, from an asset identification tag, identification data having a first data element comprising a global routing prefix of an Internet Protocol address and a second data element comprising an asset identifier indicating one or more asset properties of an asset, the asset identification tag having stored therein the global routing prefix and the asset identifier;
    formatting a uniform resource locator for a selected asset lookup service by appending a predetermined uniform asset lookup service suffix for the selected asset lookup service to the received global routing prefix; and
    based on the formatted uniform resource locator, sending the received asset identifier to the selected asset lookup service.

13. The computer readable storage media of claim 12, wherein the one or more asset properties comprise at least one of:
    an asset model descriptor, a unique asset serial number, an asset physical location, an asset age descriptor, or an asset environment descriptor.

14. The computer readable storage media of claim 12, further comprising computer executable instructions which, when executed the by one or more processors, perform:
    storing the global routing prefix in a database, the database associating the global routing prefix with:
    the asset identifier;
    a serial number associated with the asset;
    a model of the asset;
    a manufacturer of the asset;
    an expiration date of the asset;
    a weight of the asset;
    a color of the asset; or
    a location associated with the asset.

15. The method according to claim 1, wherein the global routing prefix and the asset identifier are stored together on the asset identification tag as part of an individual Internet Protocol version 6-compliant address.

16. The method according to claim 15, wherein the asset identifier and the global routing prefix are received from the asset identification tag together in the Internet Protocol version 6-compliant address.

17. The method according to claim 1, further comprising:
    rewriting the asset identification tag with a new global routing prefix.

18. The method according to claim 17, further comprising:
    rewriting the asset identification tag with a new asset identifier.

* * * * *